United States Patent
Guest

[11] Patent Number: 6,109,664
[45] Date of Patent: Aug. 29, 2000

[54] COLLETS FOR LOCKING TUBES IN COUPLING BODIES

[76] Inventor: John Derek Guest, 'Iona', Canon Hill Way, Bray, Maidenhead SL6 2EX, United Kingdom

[21] Appl. No.: 09/095,790

[22] Filed: Jun. 11, 1998

[30] Foreign Application Priority Data

Jun. 12, 1997 [GB] United Kingdom .................... 9712290

[51] Int. Cl.$^7$ ................................................. F16L 39/00
[52] U.S. Cl. ............................ 285/319; 285/423; 285/906
[58] Field of Search ..................................... 285/322, 323, 285/256, 921, 319, 340, 906, 423

[56] References Cited

U.S. PATENT DOCUMENTS

| | | | |
|---|---|---|---|
| 4,005,883 | 2/1977 | Guest | 285/322 |
| 4,178,023 | 12/1979 | Guest | 285/323 |
| 4,969,668 | 11/1990 | Sauer | 285/256 |
| 5,082,315 | 1/1992 | Sauer | 285/256 |
| 5,370,423 | 12/1994 | Guest | 285/39 |
| 5,390,969 | 2/1995 | Guest | 285/38 |
| 5,582,435 | 12/1996 | Goto et al. | 285/256 X |
| 5,681,062 | 10/1997 | Fukao et al. | 285/340 |
| 5,683,121 | 11/1997 | Guest | 285/322 |

*Primary Examiner*—Dave W. Arola
*Attorney, Agent, or Firm*—Baker & Daniels

[57] ABSTRACT

The disclosure relates to a collet for locking a tube in a coupling body, comprising a plastics molding including an annular sleeve, having a plurality of axially extending resilient arms, two of which have spring metal clips snapped around and locked to the free ends of the arms. The clips have inwardly angled teeth to bear against and grip a tube extending on the inner side of the arm through the collet to prevent the tube from being withdrawn from the collet.

8 Claims, 1 Drawing Sheet

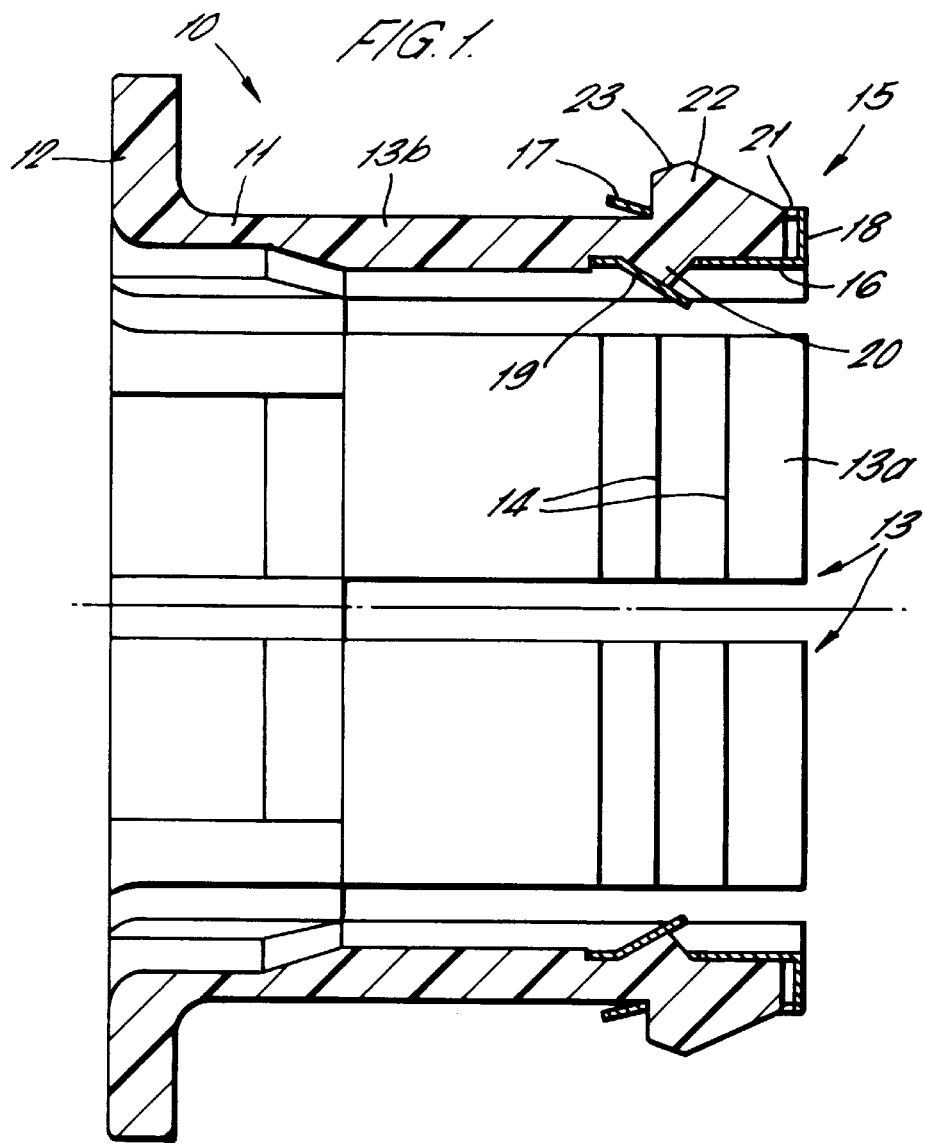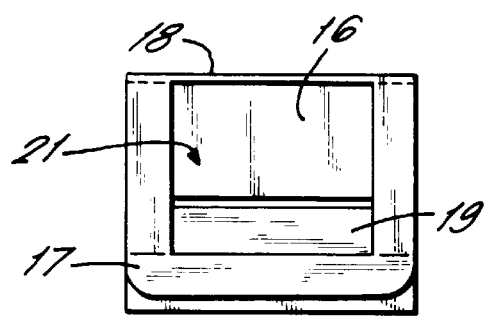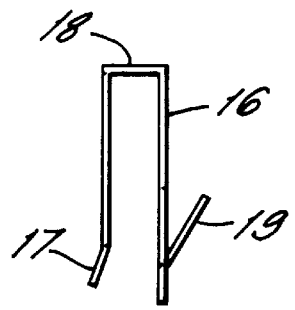

COLLETS FOR LOCKING TUBES IN COUPLING BODIES

BACKGROUND OF THE INVENTION

1. Field of the Invention

This invention relates to collets for locking tubes in coupling bodies.

2. Background Prior Art

In my U.K. Patent Specification Number 1573757 I describe and illustrate injection molded collets for locking tubes into coupling bodies. The collets comprise an annular element having a plurality of resilient arms with inwardly directed metal teeth molded into the free ends of the arms to engage and grip the surface of the tube extending through the collet for locking the tube in a coupling body. The moldings required for moulding the metal teeth in the coupling body are relatively expensive and an object of the present invention is to provide an alternative collet construction in which metal teeth can be provided on the collet arm for a wide range of collet sizes with a simplified construction enabling simplified and therefore cheaper molds to be used.

SUMMARY OF THE INVENTION

This invention provides a collet for locking a tube in a coupling body, the collet comprising a plastics molding including an annular element with at least one axially extending resilient arm and a spring metal clip snapped around and locked to the free end of the arm having an inwardly angled tooth to bear against and grip a tube extending on the inner side of the arm through the collet to prevent the tube from being withdrawn from the collet.

In one embodiment according to the invention the spring metal clip may be U-shaped to embrace and lock with the free end of the arm.

More specifically the U-shaped clip may have spaced legs to receive between them the free end of the arm with one leg engaging the inner side of the arm and having said inwardly projecting tooth and the other leg engaging the outer side of the arm.

In any of the above arrangements the outer side of the arm and said other leg of the clip may have inter-engaging means to lock the clip to the arm against detachment in the lengthwise direction of the arm.

In the latter arrangement the inter-engaging means between said other leg of the clip and the outer side of the arm comprise an integral up stand on the arm and an aperture in the leg of the clip which snaps over the up-stand.

Also in any of the above arrangements the collet may have a plurality of axially extending resilient arms formed integrally with the annular element of the collet, one or more of which arms is provided with a spring metal clip thereon.

For example the collet may have a plurality of arms carrying said spring metal clips and a plurality of arms having inwardly directed integral plastic teeth at the free ends thereof for gripping a tube extending through the collet.

Alternatively the collet may have a number of axially extending arms, all of which have said spring metal clips at the free ends thereof.

In a further arrangement the collet may be in the form of an annular sleeve having one or more resilient arms formed around the sleeve and provided with said spring metal clips at the free ends thereof to grip a tube extending through the collet.

BRIEF DESCRIPTION OF THE DRAWINGS

FIG. 1 is cross-sectional view through a collet of a tube coupling body incorporating a clip-on metal tooth;

FIG. 2 is a plan view of the clip-on metal tooth and;

FIG. 3 is a side view of the tooth.

DESCRIPTION OF THE PREFERRED EMBODIMENTS

The drawings show a molded plastics collet indicated generally at 10 for locking a tube in a tube coupling body as described and illustrated in our UK Patent No. 1573757. The collet comprises an annular sleeve 11 having an out turned flanger head 12 at one end and six resilient arms 13 extending axially from the other end of the sleeve. Four of the six arms designated at 13a are formed at the inner sides of the free ends with molded in teeth 14 to engage and grip the surface of a tube extending through the collet. The outer sides of the arms 13 have shallow V-section ramps not shown for engaging a cam surface in the tube coupling body to force the arms inwardly with movement of the collet outwardly of the coupling body to press the inner sides of the collet arms into gripping engagement with the tube extending through the collet.

The other two arms designated 13b of the collet which are spaced diametrically of the collet have U-shaped spring metal clips indicated at 15 mounted thereon. Each clip has an inner leg 16 to engage the inner side of the collet arm and an outer leg 17 to engage the outer side of the collet arm a flat base (18) to extend over the end of the arm. The inner leg 16 of the clip is formed with an inwardly angled resilient tooth 19 to bear against and grip the outer surface of the tube extending through the collet. The tooth is supported on a shallow raised ramp 20 formed integrally with the inner side of the arm.

The outer leg 17 of the clip has an enlarged aperture 21 to receive and engage over an up stand 22 formed integrally with the outer side of the end of the arm 13 to retain the clip on the arm.

The up-stand 22 is formed with an inclined face 23 to engage the taper cam surface in the through way in the coupling body to press the arm inwardly into engagement with a tube in the collet as the collet is withdrawn slightly from the coupling body.

It will be appreciated that the provision of a metal tooth on the collet arm by clipping a tooth onto the arm provides a much simpler means of attachment of the tooth than the molded in arrangement described and illustrated in our UK Patent No. 1573757. One clip type can be used for a large range of collet sizes and types thus simplifying the expense of molding and the arrangement also lends itself to a number of different collet forms. For example, each arm of the collet may be provided with a metal clip or only selected arms as in the embodiment described above. Also a sleeve form collet having one or two resilient arms provided with metal clips may be used.

What is claimed is:

1. A collet for locking a tube in a coupling body, the collet comprising a plastics molding including an annular element having first and second sides, a plurality of axially extending resilient arms extending from said first side of said annular element and including a first arm having a free end, an inner side and an outer side, and a spring metal clip snapped around and locked to the free end of the first arm, the spring metal clip having an inwardly angled tooth to bear against and grip a tube extending on the inner side of the arm through the collet to prevent the tube from being withdrawn from the collet.

2. A collet as claimed in claim 1, where the spring metal clip is U-shaped to embrace and lock with the free end of the first arm.

3. A collet as claimed in claim 2, wherein the U-shaped clip has spaced first and second legs to receive therebetween said free end of the first arm with the first leg engaging the inner side of the first arm and having said inwardly projecting tooth and the second leg engaging the outer side of the first arm.

4. A collet as claimed in claim 3, wherein the outer side of the first arm and said second leg of the clip have inter-engaging means to lock the clip to the first arm against detachment in the lengthwise direction of the first arm.

5. A collet as claimed in claim 4, wherein said inter-engaging means comprises an integral up-stand on the first arm and an aperture in the second leg of the clip which snaps over the up-stand.

6. A collet as claimed in claim 1, wherein the plurality of axially extending resilient arms are formed integrally with the annular element of the collet each of said arms provided with a spring metal clip.

7. A collet as claimed in claim 6, wherein said collet further includes a second plurality of arms axially extending from said first side, each one of said second plurality of arms having a free end including an inwardly directed integral plastic tooth for gripping a tube extending through the collet.

8. A collet as claimed in claim 6, wherein the collet comprises an annular sleeve.

* * * * *

UNITED STATES PATENT AND TRADEMARK OFFICE
CERTIFICATE OF CORRECTION

PATENT NO. : 6,109,664
DATED : August 29, 2000
INVENTOR(S) : John Derek Guest

It is certified that error appears in the above-identified patent and that said Letters Patent are hereby corrected as shown below: Title page, In the Foreign Application Priority Data section, change the United Kingdom patent reference to read "9712290.7"

Change to title to read "In or Relating to Collets for Locking Tubes in Coupling Bodies"

Signed and Sealed this

Seventeenth Day of April, 2001

Attest:

NICHOLAS P. GODICI

*Attesting Officer*    *Acting Director of the United States Patent and Trademark Office*